(12) United States Patent  
Iizuka

(10) Patent No.: US 12,296,619 B2  
(45) Date of Patent: May 13, 2025

(54) RUBBER COMPOSITION FOR TIRES

(71) Applicant: The Yokohama Rubber Co., LTD., Tokyo (JP)

(72) Inventor: Miyuki Iizuka, Kanagawa (JP)

(73) Assignee: The Yokohamma Rubber Co., LTD., Tokyo (JP)

( * ) Notice: Subject to any disclaimer, the term of this patent is extended or adjusted under 35 U.S.C. 154(b) by 190 days.

(21) Appl. No.: 18/005,785

(22) PCT Filed: Jul. 12, 2021

(86) PCT No.: PCT/JP2021/026137  
§ 371 (c)(1),  
(2) Date: Jan. 17, 2023

(87) PCT Pub. No.: WO2022/019165  
PCT Pub. Date: Jan. 27, 2022

(65) Prior Publication Data  
US 2023/0322024 A1    Oct. 12, 2023

(30) Foreign Application Priority Data  
Jul. 22, 2020   (JP) ................................ 2020-125429

(51) Int. Cl.  
*C08L 9/06*       (2006.01)  
*B60C 1/00*      (2006.01)  
(Continued)

(52) U.S. Cl.  
CPC ........ *B60C 1/0016* (2013.01); *B60C 11/0302* (2013.01); *C08K 13/02* (2013.01);  
(Continued)

(58) Field of Classification Search  
CPC ........... C08L 2205/025; C08L 2205/03; C08L 2205/06; C08L 2207/324; C08L 9/00;  
(Continued)

(56) References Cited

U.S. PATENT DOCUMENTS

2003/0199619 A1 * 10/2003 Cruse .................... C07F 9/4012  
556/400  
2006/0106143 A1 * 5/2006 Lin ........................ C08K 5/548  
524/262  
(Continued)

FOREIGN PATENT DOCUMENTS

EP           1714984 A1 * 10/2006 ........... B60C 1/0016  
JP       2017114975 A  *  6/2017  
(Continued)

*Primary Examiner* — Mark S Kaucher  
(74) *Attorney, Agent, or Firm* — Thorpe North & Western

(57) ABSTRACT

A rubber composition contains: in 100 parts by mass of a diene rubber containing from 25 to 50 mass % of a butadiene rubber, 50 parts by mass or more of a plasticizer component; from 120 to 180 parts by mass of silica; $M_1$ parts by mass of 3-octanoylthio-1-propyltriethoxysilane; and $M_2$ parts by mass of alkylsilane. $(M_1+M_2)$, a total of the 3-octanoylthio-1-propyltriethoxysilane and the alkylsilane, is from 5 to 10 mass % with respect to the mass of the silica, and $[M_2/(M_1+M_2)]$, a ratio of the alkylsilane with respect to the total of the 3-octanoylthio-1-propyltriethoxysilane and the alkylsilane, is from 0.10 to 0.40.

6 Claims, 2 Drawing Sheets

(51) Int. Cl.
*B60C 11/03* (2006.01)
*C08K 13/02* (2006.01)
*C08K 3/04* (2006.01)
*C08K 3/36* (2006.01)
*C08K 5/5419* (2006.01)
*C08K 5/548* (2006.01)

(52) U.S. Cl.
CPC .................. *C08L 9/06* (2013.01); *C08K 3/04* (2013.01); *C08K 3/36* (2013.01); *C08K 5/5419* (2013.01); *C08K 5/548* (2013.01); *C08K 2201/006* (2013.01); *C08K 2201/014* (2013.01); *C08L 2205/025* (2013.01); *C08L 2205/03* (2013.01); *C08L 2205/06* (2013.01); *C08L 2207/324* (2013.01)

(58) Field of Classification Search
CPC .. C08L 9/06; C08L 91/00; C08K 3/04; C08K 3/36; C08K 3/06
See application file for complete search history.

(56) References Cited

U.S. PATENT DOCUMENTS

| | | | | |
|---|---|---|---|---|
| 2007/0175557 | A1* | 8/2007 | Puhala | C08L 9/00 152/209.5 |
| 2017/0073508 | A1* | 3/2017 | Schwekendiek | C08L 91/00 |
| 2019/0300681 | A1* | 10/2019 | Lee | C08L 9/00 |
| 2020/0095403 | A1* | 3/2020 | Papakonstantopoulos | C08L 15/00 |

FOREIGN PATENT DOCUMENTS

| | | |
|---|---|---|
| JP | 2019-089869 A | 6/2019 |
| JP | 2019-199523 A | 11/2019 |
| JP | 2019-218481 A | 12/2019 |
| JP | 2020-029474 A | 2/2020 |
| JP | 6687069 B2 | 4/2020 |
| JP | 2021-020615 A | 2/2021 |

* cited by examiner

RUBBER COMPOSITION FOR TIRES

TECHNICAL FIELD

The present technology relates to a rubber composition for a tire having excellent performance on snow, wet grip performance, and forming processability.

BACKGROUND ART

Winter tires are required to provide performance on snow and wet grip performance in a compatible manner and excellent safety. A large amount of silica may be blended in a rubber composition for a tire to achieve excellent wet grip performance; however, performance on snow may deteriorate due to excessively large rubber hardness and rigidity. Meanwhile, a large amount of plasticizer or silica dispersant may be blended to reduce the rubber hardness and to maintain the performance on snow; however, there is concern that sheet breakage due to decrease in compound strength before vulcanization (strength of rubber composition before vulcanization) and/or deterioration of forming processability may occur because of foam being readily formed at the time of extrusion molding due to lowered viscosity.

Japan Patent No. 6687069 B discloses a pneumatic tire, which is a tire for all-seasons that prioritizes dry grip performance, wet grip performance, low rolling resistance, and performance on snow, formed by a rubber composition containing particular amounts of two types of modified styrene-butadiene rubbers, a butadiene rubber, silica, a silane coupling agent, and an oil. However, the tire described in Japan Patent No. 6687069 B does not always have satisfactory performance on snow, and further enhancement of the performance on snow together with the wet grip performance has been demanded.

SUMMARY

The present technology provides a rubber composition for a tire having excellent performance on snow, wet grip performance, and forming processability, while containing a large amount of silica.

The rubber composition for a tire according to an embodiment of the present technology contains: in 100 parts by mass of a diene rubber containing from 25 to 50 mass % of a butadiene rubber, 50 parts by mass or more of a plasticizer component; from 120 to 180 parts by mass of silica; $M_1$ parts by mass of 3-octanoylthio-1-propyltriethoxysilane; and $M_2$ parts by mass of alkylsilane. $(M_1+M_2)$, a total of the 3-octanoylthio-1-propyltriethoxysilane and the alkylsilane, is from 5 to 10 mass % with respect to the mass of the silica, and $[M_2/(M_1+M_2)]$, a ratio of the alkylsilane with respect to the total of the 3-octanoylthio-1-propyltriethoxysilane and the alkylsilane, is from 0.10 to 0.40.

According to the rubber composition for a tire of an embodiment of the present technology, because the blended amounts of the butadiene rubber, the plasticizer component, the 3-octanoylthio-1-propyltriethoxysilane, and the alkylsilane are specified while a large amount of the silica is blended, dispersibility of the silica can be further enhanced, and a rubber composition for a tire having excellent performance on snow, wet grip performance, and forming processability can be obtained.

The rubber composition for a tire preferably has a CTAB (cetyltrimethylammonium bromide) adsorption specific surface area of the silica of 80 to 175 $m^2/g$ and can further enhance the balance of the performance on snow, the wet grip performance, and the forming processability.

The rubber composition for a tire preferably contains from 3 to 20 parts by mass of a low molecular weight butadiene rubber having a number average molecular weight of 10000 to 50000 in 100 parts by mass of the diene rubber, and can further enhance the performance on snow and the wet grip performance.

The tire according to an embodiment of the present technology is a tire containing the rubber composition for a tire described above in a tread portion. The tire includes: a plurality of first inclined main grooves being inclined to one side with respect to a tire circumferential direction, extending and opening to a tire equatorial plane and a tire ground contact edge on the one side; a plurality of second inclined main grooves being inclined to an other side with respect to the tire circumferential direction, extending and opening to the tire equatorial plane and a tire ground contact edge on the other side; a plurality of first land portions being defined and formed by a pair of the first inclined main grooves adjacent to each other and one of the second inclined main grooves, the plurality of first land portions extending from the tire equatorial plane to the tire ground contact edge on the one side; and a plurality of second land portions being defined and formed by a pair of the second inclined main grooves adjacent to each other and one of the first inclined main grooves, the plurality of second land portions extending from the tire equatorial plane to the tire ground contact edge on the other side. The plurality of first land portions are arrayed adjacent to each other in the tire circumferential direction, the plurality of second land portions are arrayed adjacent to each other in the tire circumferential direction, the first land portions and the second land portions are arrayed in a staggered manner along the tire equatorial plane, each of the first land portions and the second land portions includes a plurality of through grooves that extend through the land portion and open to the pair of inclined main grooves and a plurality of blocks defined and formed by the through grooves, the blocks include an innermost center block, which is defined as a block closest to the tire equatorial plane, and an edge portion of the innermost center block includes a notch portion that opens to a connection portion of the inclined main grooves.

DETAILED DESCRIPTION

Figure 1:
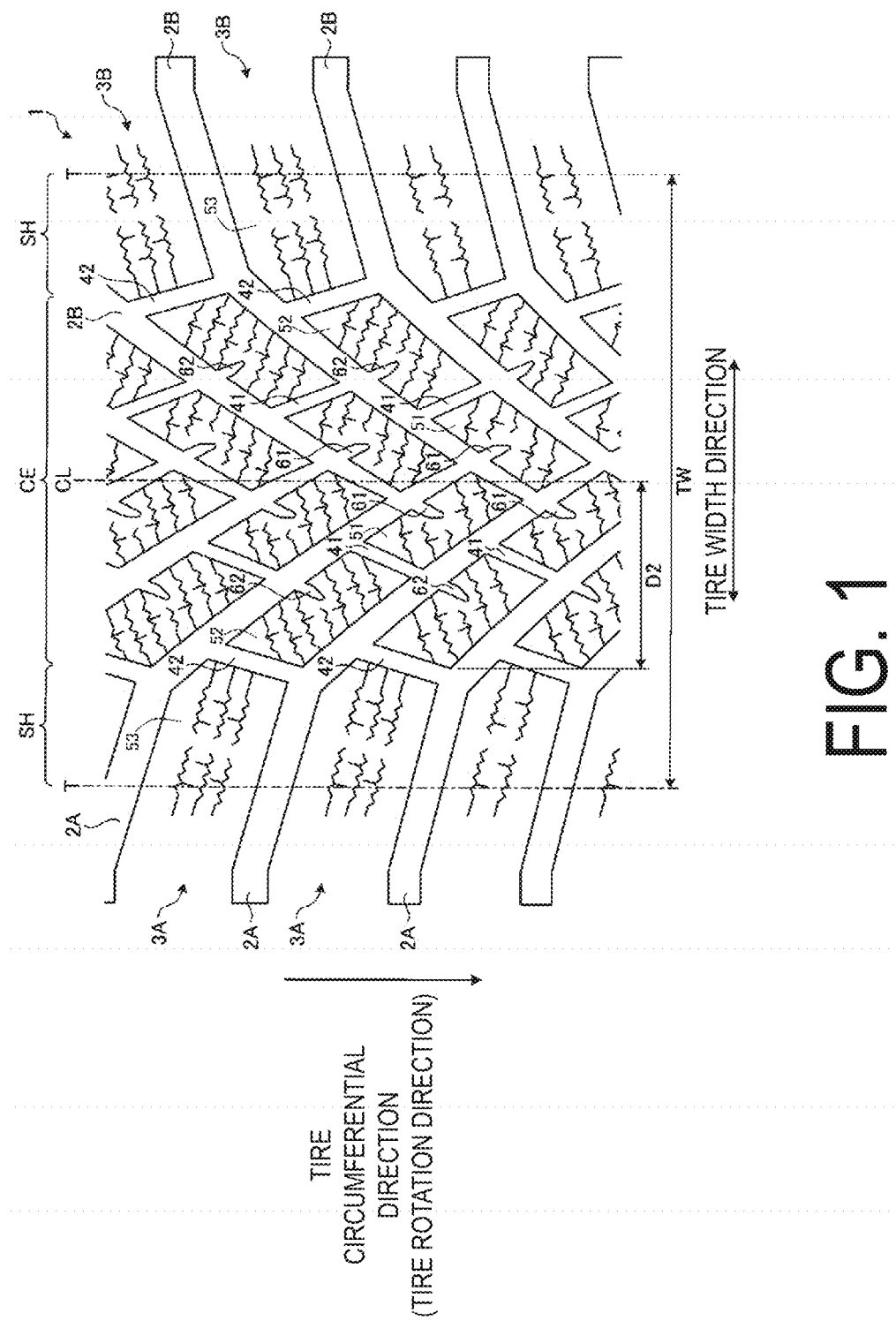
FIG. 1 is a plan view illustrating a tread surface of a tire according to an embodiment of the present technology.

The rubber composition for a tire according to an embodiment of the present technology is suitable for forming a tread portion for a winter tire and contains, in 100 parts by mass of a diene rubber containing from 25 to 50 mass % of a butadiene rubber, 50 parts by mass or more of a plasticizer component, from 120 to 180 parts by mass of silica, $M_1$ parts by mass of 3-octanoylthio-1-propyltriethoxysilane, and $M_2$ parts by mass of alkylsilane, a total $(M_1+M_2)$ of the 3-octanoylthio-1-propyltriethoxysilane and the alkylsilane being from 5 to 10 mass % with respect to the mass of the silica, and a ratio $[M_2/(M_1+M_2)]$ of the alkylsilane with respect to the total of the 3-octanoylthio-1-propyltriethoxysilane and the alkylsilane being from 0.10 to 0.40.

The rubber composition for a tire contains from 25 to 50 mass % of a butadiene rubber in 100 mass % of the diene rubber. The butadiene rubber is not particularly limited as long as the butadiene rubber is a butadiene rubber that is typically used for a rubber composition for a tire. Because the butadiene rubber has a low glass transition temperature, the butadiene rubber can enhance performance on snow by being blended in a rubber composition for a tire.

However, when the butadiene rubber is blended, dispersibility of silica may be deteriorated, and by this, sufficient enhancement of performance on snow and wet grip performance may not be achieved. Meanwhile, by employing the configuration of the present technology, dispersibility of silica can be made excellent even in the presence of butadiene rubber and excellent balance of performance on snow and wet grip performance can be achieved.

The content of the butadiene rubber is from 25 to 50 mass %, preferably more than 25 mass % and 50 mass % or less, more preferably from 28 to 46 mass %, and even more preferably from 30 to 42 mass %, in 100 mass % of the diene rubber. When the amount of the butadiene rubber is less than 25 mass %, both driving performance on snow and braking performance on snow become unsatisfactory. When the amount of the butadiene rubber is more than 50 mass %, rubber strength of the rubber composition before vulcanization (compound) decreases as well as dispersibility of silica deteriorates and wet grip performance decreases, foam is readily formed during extrusion molding, and thus forming processability deteriorates.

The diene rubber contains another diene rubber besides the butadiene rubber. Examples of such another diene rubber include natural rubber, isoprene rubber, styrene butadiene rubber, styrene isoprene rubber, isoprene butadiene rubber, ethylene-propylene-diene copolymer rubber, chloroprene rubber, and acrylonitrile butadiene rubber. These other diene rubbers may be modified with one or more functional groups. The type of the functional group is not particularly limited, and examples thereof include an epoxy group, carboxy group, amino group, hydroxy group, alkoxy group, silyl group, alkoxysilyl group, amide group, oxysilyl group, silanol group, isocyanate group, isothiocyanate group, carbonyl group, and aldehyde group.

The rubber composition for a tire contains from 120 to 180 parts by mass of the silica in the 100 parts by mass of the diene rubber. Examples of the silica include wet silica (hydrous silicic acid), dry silica (silicic anhydride), calcium silicate, and aluminum silicate. One type of these can be used alone, or a combination of two or more types of these can be used. Furthermore, surface-treated silica, in which the surface of silica is surface-treated by a silane coupling agent, may be also used.

The CTAB adsorption specific surface area of the silica is not particularly limited and is preferably from 80 to 175 $m^2/g$, and more preferably from 90 to 170 $m^2/g$. By setting the CTAB adsorption specific surface area of the silica to 80 $m^2/g$ or more, wet grip performance of the rubber composition can be ensured. Furthermore, by setting the CTAB adsorption specific surface area of the silica to 175 $m^2/g$ or less, dispersibility of silica is enhanced, and performance on snow and wet grip performance can be improved. In the present specification, the CTAB adsorption specific surface area of silica is a value measured in accordance with ISO 5794.

In 100 parts by mass of the diene rubber, from 120 to 180 parts by mass, preferably 120 parts by mass or more and 170 parts by mass or less, and more preferably from 125 to 160 parts by mass of the silica is blended. By setting the blended amount of the silica to be 120 parts by mass or more, wet grip performance can be enhanced. Furthermore, by setting the blended amount of the silica to 180 parts by mass or less, rubber strength of the rubber composition before vulcanization (compound) is ensured as well as performance on snow is enhanced, and formation of foam during extrusion molding can be suppressed, and forming processability can be enhanced.

The rubber composition for a tire can contain another filler besides the silica. Examples of such another filler include carbon black, calcium carbonate, magnesium carbonate, talc, clay, alumina, aluminum hydroxide, titanium oxide, and calcium sulfate. Among these, carbon black is preferred. One type of these other fillers can be used alone, or a combination of two or more types of these can be used.

By allowing 3-octanoylthio-1-propyltriethoxysilane to be blended as a silane coupling agent, the rubber composition for a tire can enhance dispersibility of silica. That is, the 3-octanoylthio-1-propyltriethoxysilane has an excellent effect of improving dispersibility of silica compared to other sulfur-containing silane coupling agents and can make wet grip performance excellent as well as driving performance on snow and braking performance on snow excellent.

By allowing the rubber composition for a tire to contain alkylsilane, dispersibility of silica can be enhanced. The alkylsilane is not particularly limited, and examples thereof include alkyltriethoxy silane and alkyltrimethoxysilane. The alkylsilane may have an alkyl group having preferably from 7 to 20 carbons, and more preferably from 8 to 10 carbons, and examples of the alkyl group include heptyl, octyl, nonyl, decyl, undecyl, and dodecyl.

In the present specification, with respect to 100 parts by mass of the diene rubber, the blended amount of the 3-octanoylthio-1-propyltriethoxysilane is taken as $M_1$ parts by mass, and the blended amount of the alkylsilane is taken as $M_2$ parts by mass. At this time, the proportion of the total $(M_1+M_2)$ of the 3-octanoylthio-1-propyltriethoxysilane and the alkylsilane with respect to the mass of the silica is from 5 to 10 mass %, and preferably from 6 to 9 mass %. When the total $(M_1+M_2)$ is less than 5 mass % with respect to the mass of the silica, dispersibility of silica is insufficient. Furthermore, when the total $(M_1+M_2)$ is more than 10 mass % with respect to the mass of the silica, forming processability deteriorates.

Furthermore, the ratio $[M_2/(M_1+M_2)]$ of the $M_2$ parts by mass of the alkylsilane with respect to the total $(M_1+M_2)$ of $M_1$ parts by mass of the 3-octanoylthio-1-propyltriethoxysilane and $M_2$ parts by mass of the alkylsilane is from 0.10 to 0.40, and preferably from 0.15 to 0.35. When the ratio $[M_2/(M_1+M_2)]$ is less than 0.10, effect of enhancing the performance on snow, the wet grip performance, and the forming processability cannot be sufficiently achieved. Furthermore, when the ratio $[M_2/(M_1+M_2)]$ is more than 0.40, the performance on snow, the wet grip performance, and the forming processability decrease, on the contrary.

The rubber composition for a tire contains 50 parts by mass or more, and preferably from 55 to 75 parts by mass, of a plasticizer component with respect to 100 parts by mass of the diene rubber. When the amount of the plasticizer component is less than 50 parts by mass, dispersibility of silica decreases, and performance on snow and wet grip performance become poor. Examples of the plasticizer component include oils, diene rubbers having low molecular weights, and resin components. Examples of the oil include oils that are added during preparation of rubber compositions, such as natural oils and synthetic oils. Furthermore, an oil-extending component contained in the diene rubber is also an oil. Examples of the diene rubber having a low molecular weight include low molecular weight butadiene rubber, isoprene rubber, and styrene butadiene rubber, and the diene rubber having a low molecular weight is preferably a butadiene rubber having a low molecular weight. The number average molecular weight of the diene rubber having a low molecular weight is preferably from 10000 to 50000, and more preferably from 20000 to 40000. The resin component is not particularly limited as long as the resin component is used in a rubber composition for a tire, and examples thereof include terpene resins, aromatic group-modified terpene resins, petroleum resins, coumarone-indene resins, rosin resins, and phenol resins.

The rubber composition for a tire may contain preferably from 3 to 20 parts by mass, more preferably from 4 to 15 parts by mass, and even more preferably from 5 to 10 parts by mass, of the low molecular weight butadiene rubber having a number average molecular weight of 10000 to 50000 with respect to 100 parts by mass of the diene rubber. By blending 3 parts by mass or more of the low molecular weight butadiene rubber, performance on snow and wet grip performance can be further enhanced.

The rubber composition for a tire may also contain various additives that are commonly used in a rubber composition for a tire within a range that does not impair the object of the present technology. Examples thereof include vulcanization or crosslinking agents, vulcanization accelerators, anti-aging agents, plasticizers, processing aids, liquid polymers, and thermosetting resins. These additives may be kneaded by any commonly known method to form a rubber composition, and can be used for vulcanization or crosslinking. Blended amounts of these additives may be any known amount, so long as the objects of the present technology are not hindered.

The rubber composition for a tire according to an embodiment of the present technology is suitable for forming a tread portion of a tire. The tire having the rubber composition for a tire in the tread portion has good forming processability while achieving excellent performance on snow and wet grip performance, and high quality tires can be stably produced.

The tire according to an embodiment of the present technology contains the rubber composition for a tire described above in a tread portion. The tread portion includes: a plurality of first inclined main grooves being inclined to one side with respect to a tire circumferential direction, extending and opening to a tire equatorial plane and a tire ground contact edge on the one side; a plurality of second inclined main grooves being inclined to an other side with respect to the tire circumferential direction, extending and opening to the tire equatorial plane and a tire ground contact edge on the other side; a plurality of first land portions being defined and formed by a pair of the first inclined main grooves adjacent to each other and by one of the second inclined main grooves, the plurality of first land portions extending from the tire equatorial plane to the tire ground contact edge on the one side; and a plurality of second land portions being defined and formed by a pair of the second inclined main grooves adjacent to each other and by one of the first inclined main grooves, the plurality of second land portions extending from the tire equatorial plane to the tire ground contact edge on the other side. The plurality of first land portions are arrayed adjacent to each other in the tire circumferential direction, the plurality of second land portions are arrayed adjacent to each other in the tire circumferential direction, the first land portions and the second land portions are arrayed in a staggered manner along the tire equatorial plane, each of the first land portions and the second land portions includes a plurality of through grooves that extend through the land portion and open to the pair of inclined main grooves and a plurality of blocks defined and formed by the through grooves, the blocks include an innermost center block, which is defined as a block closest to the tire equatorial plane, and an edge portion of the innermost center block includes a notch portion that opens to a connection portion of the inclined main grooves.

FIG. 1 is a plan view illustrating a tread surface of a tire according to an embodiment of the present technology. A tire rotation direction illustrated in FIG. 1 is defined as a rotation direction frequently used when the tire is in use and more specifically as a rotation direction when a vehicle advances. Furthermore, a ground contact leading side (so-called leading side or toe side) and a ground contact trailing side (so-called trailing side or heel side) of a block when the tire comes into contact with the ground are defined by the tire rotation direction.

Further, a tire ground contact edge T is defined as a maximum width position in a tire axial direction of a contact surface between the tire and a flat plate when the tire is mounted on a specified rim, inflated to a specified internal pressure, placed vertically on the flat plate in a static state, and loaded with a load corresponding to a specified load. "Specified rim" refers to an "applicablerim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, the specified internal pressure refers to a "maximum air pressure" specified by JATMA, the maximum value in "TIRE LOAD LIMITS AT VARIOUS COLD INFLATION PRESSURES" specified by TRA, or "INFLATION PRESSURES" specified by ETRTO. Additionally, the specified load refers to a "maximum load capacity" specified by JATMA, the maximum value in "TIRE LOAD LIMITS AT VARIOUS COLD INFLATION PRESSURES" specified by TRA, or "LOAD CAPACITY" specified by ETRTO. However, in the case of JATMA, for a tire for a passenger vehicle, the specified internal pressure is an air pressure of 180 kPa, and the specified load is 88% of the maximum load capacity.

As illustrated in FIG. 1, the tire 1 includes first and second inclined main grooves 2A, 2B and first and second land portions 3A, 3B, which are defined and formed by the inclined main grooves 2A, 2B, respectively. The first inclined main groove 2A extends while inclining to one side (left side in the drawings) with respect to the tire circumferential direction and opens to the tire equatorial plane CL and the tire ground contact edge T on the one side. Additionally, a plurality of the first inclined main grooves 2A are arrayed at predetermined intervals in the tire circumferential direction. The second inclined main groove 2B extends while inclining to the other side (right side in the drawings) with respect to the tire circumferential direction and opens to the tire equatorial plane CL and the tire ground contact edge T on the other side. Additionally, a plurality of the second inclined main grooves 2B are arrayed at predetermined intervals in the tire circumferential direction. Specifically, the first and second inclined main grooves 2A, 2B each incline from the tire equatorial plane CL toward the outer side in the tire width direction to an opposite side of the tire rotation direction (i.e., the ground contact trailing side). Moreover, the first and second inclined main grooves 2A, 2B each extend beyond the tire equatorial plane CL.

Also, one first inclined main groove 2A opens in a Y-shape to one second inclined main groove 2B, thus constituting one main groove unit (unit made of a pair of the inclined main grooves 2A, 2B; reference sign omitted in the drawings). Specifically, the first inclined main groove 2A connects sideways to the second inclined main groove 2B, and terminates without intersecting the second land portion 3B on an extension line of the groove center line. Additionally, the second inclined main groove 2B of the main groove unit opens in the Y-shape to the first inclined main groove 2A of another main groove unit adjacent in the tire rotation direction. Moreover, the second inclined main groove 2B connects sideways to the first land portion 3A, and terminates without intersecting the first land portion 3A on an extension line of the groove center line. Also, a plurality of the main groove units (2A, 2B) are repeatedly arrayed and connected in the tire circumferential direction.

Accordingly, the first inclined main grooves 2A and the second inclined main grooves 2B are alternately connected in the Y-shape in the tire circumferential direction, forming a tread pattern in which a plurality of the inclined main grooves 22A, 2B are connected in the tire circumferential direction.

In the configuration described above, the inclined main grooves 2A, 2B are connected to each other in the Y-shape and arrayed in the tire circumferential direction without passing through long land portions 3A, 3B extending from the tire equatorial plane CL to the tire ground contact edge T as described above. Accordingly, the arrangement efficiency of the inclined main grooves 2A, 2B and the long land portions 3A, 3B is made appropriate, and the drainage properties and the rigidity in the ground contact region of the tire are made appropriate.

For example, in the configuration of FIG. 1, the first and second inclined main grooves 2A, 2B have a linear symmetrical structure centered on the tire equatorial plane CL, and are arrayed in a staggered manner in the tire circumferential direction. Additionally, the first and second inclined main grooves 2A, 2B have an arc shape that is gently curved or an L shape that is gently bent. Also, inclination angles of the first and second inclined main grooves 2A, 2B (dimension symbols omitted in the drawings) monotonically increase from the tire equatorial plane CL toward the outer side in the tire width direction. Accordingly, the drainage properties of the ground contact region of the tire are enhanced.

The inclination angles of the inclined main grooves 2A, 2B are each defined and formed as an angle formed by the tangent line with respect to a groove center line of the inclined main groove and an opposite direction of the tire rotation direction. The groove center line of the inclined main groove is defined as a smooth curve connecting midpoints of the groove walls of left and right of the inclined main groove.

The first land portion 3A is defined and formed by a pair of the first inclined main grooves 2A, 2A adjacent in the tire circumferential direction and one second inclined main groove 2B, and has a long structure extending from the tire equatorial plane CL to the tire ground contact edge T on one side (left side in the drawings). Additionally, a plurality of the first land portions 3A, 3A are arrayed adjacent to each other in the tire circumferential direction. Similarly, the second land portion 3B is defined and formed by a pair of the second inclined main grooves 2B, 2B adjacent to each other in the tire circumferential direction and one first inclined main groove 2A, and has a long structure extending from the tire equatorial plane CL to the tire ground contact edge T on the other side (right side in the drawings). Additionally, a plurality of the second land portions 3B are arrayed adjacent to each other in the tire circumferential direction. Also, the first land portions 3A and the second land portions 3B are arrayed in a staggered manner along the tire equatorial plane CL while inverting the longitudinal direction therebetween.

For example, in the configuration of FIG. 1, the first and second land portions 3A, 3B have a linear symmetrical structure centered on the tire equatorial plane CL, and are arrayed in the staggered manner in the tire circumferential direction. Additionally, the first and second land portions 3A, 3B have a long shape that is gently curved or bent. Additionally, longitudinal directions of the first and second land portions 3A, 3B each incline from the tire equatorial plane CL toward the outer side in the tire width direction to an opposite side (i.e., the ground contact trailing side) in the tire rotation direction. Also, widths (dimension symbols omitted in the drawings) of the first and second land portions 3A, 3B monotonically increase from the tire equatorial plane CL toward the outer side in the tire width direction. Accordingly, the grounding characteristics of the tire are enhanced.

Furthermore, one land portion 3A (3B) includes a plurality of through grooves 41, 42 and a plurality of blocks 51 to 53 defined and formed by the through grooves 41, 42. Preferably, the number of through grooves in the one land portion 3A (3B) is 2 or more and 4 or less and the number of blocks therein is 3 or more and 5 or less. The through grooves 41, 42 have an open structure that extends through the land portion 3A (3B) and open to a pair of adjacent inclined main grooves 2A, 2A (2B, 2B). Additionally, a plurality of the through grooves 41, 42 are disposed at predetermined intervals in the longitudinal direction of the land portion 3A (3B).

Additionally, in the configuration of FIG. 1, the plurality of the outermost through grooves 42 are arrayed in the tire circumferential direction, and the outermost through grooves 42 have the inclination angle θ2 described above, and thus the opening positions with respect to the inclined main grooves 2A and 2B are mutually offset. Accordingly, circumferential grooves having a zigzag shape are formed by alternately connecting the outermost through grooves 42 and portions of the inclined main grooves 2A, 2B in the tire circumferential direction.

The blocks 51 to 53 are defined and formed by the plurality of the through grooves 41, 42, and are arrayed in a row along a pair of inclined main grooves 2A, 2A (2B, 2B) defining the land portions 3A (3B). In the configuration of FIG. 3, one land portion 3A (3B) includes three blocks 51 to 53. Additionally, the blocks 51 to 53 of a tread portion center region have a trapezoidal shape with edge portions on the sides of the pair of inclined main grooves 2A, 2A (2B, 2B) being substantially parallel opposite sides. Moreover, the blocks 51, 52 of the tread portion center region have acute corner portions on the leading side in the tire rotation direction and on the outer side in the tire width direction, A tread portion center region CE (see FIG. 1) is defined as a region on an inner side in the tire width direction demarcated by the outermost through grooves 42 on an outermost side in the tire width direction. Additionally, a tread portion shoulder region SH is defined as a region on the outer side in the tire width direction demarcated by the outermost through grooves 42.

Furthermore, the center blocks 51, 52 are in the tread portion center region, and innermost center blocks 51 which are the closest to the tire equatorial plane CL are disposed on the tire equatorial plane CL, and outermost center blocks 52 are disposed on the outer side in the tire width direction. The center blocks 51, 52 each include a first notch portion 61 or a second notch portion 62. The first notch portion 61 and the second notch portion 62 are notch portions of blocks and are distinguished from each other with respect to the inclined main grooves 2A, 2B, respectively.

The first notch portion 61 is formed in the edge portion of the innermost center block 51 on the side of the inclined main groove 2A or 2B and opens to a connection portion of the inclined main grooves 2A, 2B of left and right. Specifically, the first notch portion 61 opens to a position where an inclined main groove 2A or 2B on one side connects sideways in the Y-shape to an inclined main groove 2B or 2A on the other side, and is disposed on an extension line of a groove center line of the inclined main groove 2A or 2B on the one side. The first notch portion 61 is formed in the edge portion of the innermost center block 51 on the trailing side in the tire rotation direction. On the other hand, the edge portion of the innermost center block 51 on the leading side in the tire rotation direction does not have a notch portion. The notch portion is defined as a step-shaped recess portion (that is, a step portion) having a bottom surface parallel to the road contact surface of the land portion. Additionally, a short lug groove may be formed instead of the notch portion.

The second notch portion 62 is formed in the edge portion of another center block 52 on the side of the inclined main groove 2A or 2B and opens to a connection portion of the inclined main groove 2A or 2B and a communication groove 41. Specifically, the second notch portion 62 is disposed at a position facing an opening portion, with respect to the inclined main groove 2A or 2B, of the communication groove 41. Additionally, the second notch portion 62 is formed in the edge portion of the center block 52 on the trailing side in the tire rotation direction. On the other hand, the edge portion on the leading side of the center block 52 in the tire rotation direction does not have a notch portion.

In the configuration described above, the connection portion of the inclined main grooves 2A, 2B is widened by the first notch portion 61, and the drainage properties of the tread portion center region improve. Furthermore, snow traction properties improve due to the edge components of the first notch portion 61. Accordingly, the wet performance and the snow performance of the tire improve.

In the tire, (1) the first inclined main groove 2A and the second inclined main groove 2B extend from the tire ground contact edge T to the tire equatorial plane CL, and thus the edge components of the tread portion improve and the braking on snow performance of the tire improves, and the drainage properties of the tread portion improve and the wet braking performance of the tire improves. Additionally, (2) the land portions 3A, 3B extend from the tire equatorial plane CL to the tire ground contact edge T and are arrayed adjacent to each other in the tire circumferential direction, and thus, compared to a configuration in which a third land portion is disposed between the land portions 3A, 3B (see, for example, FIG. 2), the arrangement efficiency of the inclined main grooves 2A, 2B and the land portions 3A, 3B is made appropriate, and the drainage properties and the rigidity in the ground contact region of the tire are made appropriate. Moreover, (3) the first land portions 3A and the second land portions 3B are arrayed in the staggered manner along the tire equatorial plane CL while inversing the longitudinal direction therebetween, and thus the snow traction performance and the braking on snow performance of the tire improve. Further, (4) the edge portion of the innermost center block has the notch portion that opens to the connection portion of the inclined main grooves, and thus the drainage properties of a tread portion center region improve. These have the advantage of improving the snow performance and the wet performance of the tire.

Embodiments according to the present technology are further described below by Examples. However, the scope of the present technology is not limited to these Examples.

EXAMPLE

Each of rubber compositions for tires (Examples 1 to 5, Standard Example, and Comparative Examples 1 to 10) was prepared according to the formulations listed in Tables 1 and 2 with the compounding agents listed in Table 3 used as common components. With the exception of the sulfur and the vulcanization accelerator, the components were kneaded in a 1.7 L sealed Banbury mixer for 5 minutes, then discharged from the mixer, and cooled at room temperature. This was placed in the 1.7 L sealed Banbury mixer described above, and the sulfur and the vulcanization accelerators were then added and mixed, and thus a rubber composition for a tire was prepared. Furthermore, the blended amounts of the compounding agents shown in Table 3 are expressed as values in part by mass per 100 parts by mass of the diene rubbers shown in Tables 1 and 2. By using the obtained rubber compositions for tires, green strength, extrusion formability, and Payne effect were evaluated by the following evaluation methods.

Green Strength

Using the obtained rubber composition for a tire and a predetermined mold (thickness: 2 mm), pressing was performed at 100° C. for 5 minutes, and adjustment was performed for a predetermined time period at a constant temperature. The obtained material was punched into JIS (Japanese Industrial Standard) No. 2 dumbbell, and thus a tensile test piece was produced. The tensile strength at break was measured in accordance with the tensile test method of JIS K 6301 and used as green strength. The obtained values are listed in rows of "Green strength" in Tables 1 and 2 with Standard Example being assigned as an index of 100. A larger index value indicates a higher rubber strength of the rubber composition during forming processing, capability of suppressing failures such as sheet breakage, and being excellent.

Extrusion Formability

Using the obtained rubber composition for a tire, extrusion formability was evaluated by Garvey die extrusion test. In other words, by using an extruder equipped with a Garvey die at a tip (single-screw barrel diameter; 20 mm; rotation speed: 30 rpm; barrel temperature: 60° C.; head temperature: 80° C.), each of the rubber compositions for tires was extrusion molded, and thus 10 extrusion molded products were obtained. The cross-section of each of the 10 extrusion molded products was visually observed and evaluated in a scale of one to three based on the following criteria, and the results are listed in rows of "Extrusion formability" in Tables 1 and 2.

3: No pores (foam) were generated in the cross sections, and extrusion formability was excellent.
2: Slight degree of pores (foam) were generated in a plurality of the cross sections, and extrusion formability was somewhat poor.
1: Pores (foam) were generated in all the cross sections, and extrusion formability was poor.

Payne Effect (Indicator of Dispersibility of Silica)

After the obtained rubber composition for a tire was vulcanized by a predetermined mold at 160° C. for 20 minutes, by using a strain shear stress measurement machine (RPA2000, Alpha Technology), a strain shear stress G' at a strain of 0.28% and a strain shear stress G' at a strain of 30.0% were measured, and the difference G' 0.28 (MPa)-G'

30.0 (MPa) was calculated as Payne effect. Each of the calculated results was expressed as an index value obtained by calculating a reciprocal thereof, with Standard Example being assigned the value of 100, and listed in rows of "Payne effect" in Tables 1 and 2. A larger index value indicates a smaller Payne effect and superior dispersibility of silica.

Using the 15 types of the rubber compositions for tires obtained as described above in tread rubbers, pneumatic tires (tire size: 195/65R15) having patterns of tread portions listed in Tables 1 and 2 were vulcanization-molded. In "pattern of tread portion" of Tables 1 and 2, "FIG. 2" indicates being a tread pattern of a tire illustrated in FIG. 2, and "FIG. 1" indicates being a tread pattern of a tire illustrated in FIG. 1. By using the obtained 16 types of pneumatic tires, performance on snow (driving performance on snow and braking performance on snow) and wet grip performance were measured by the test methods described below.

Performance on Snow (Driving Performance on Snow)

The pneumatic tire obtained as described above was mounted on a standard rim, inflated to an air pressure of 250 kPa, and mounted on a test vehicle. The test vehicle was allowed to start driving from inactive state on a compacted-snow road surface, and the time required to drive 15 m was measured. Each of the obtained results is expressed as an index value obtained by calculating a reciprocal thereof, with Standard Example being assigned the value of 100, and listed in rows of "Driving performance on snow" in Tables 1 and 2. A larger index value indicates a shorter driving time and indicates being superior.

Performance on Snow (Braking Performance on Snow)

The pneumatic tire obtained as described above was mounted on a standard rim, inflated to an air pressure of 250 kPa, and mounted on a test vehicle. The test vehicle traveled on a compacted-snow road surface, and a braking distance when the test vehicle braked at an initial speed of 40 km/hour was measured. Each of the obtained results is expressed as an index value obtained by calculating a reciprocal thereof, with Standard Example being assigned the value of 100, and listed in rows of "Braking performance on snow" in Tables 1 and 2. A larger index value indicates a shorter braking distance and indicates being superior.

Wet Grip Performance

The pneumatic tire obtained as described above was mounted on a standard rim, inflated to an air pressure of 250 kPa, and mounted on a test vehicle. The test vehicle traveled on a wet road surface with relatively less protrusions and recesses, and sensory evaluation in a scale of one to five was performed for the responsiveness of steering. The obtained results are listed in rows of "Wet grip performance" in Tables 1 and 2. A larger score indicates superior wet grip performance. The scale of 4 or greater is preferred.

TABLE 1

Figure 2:
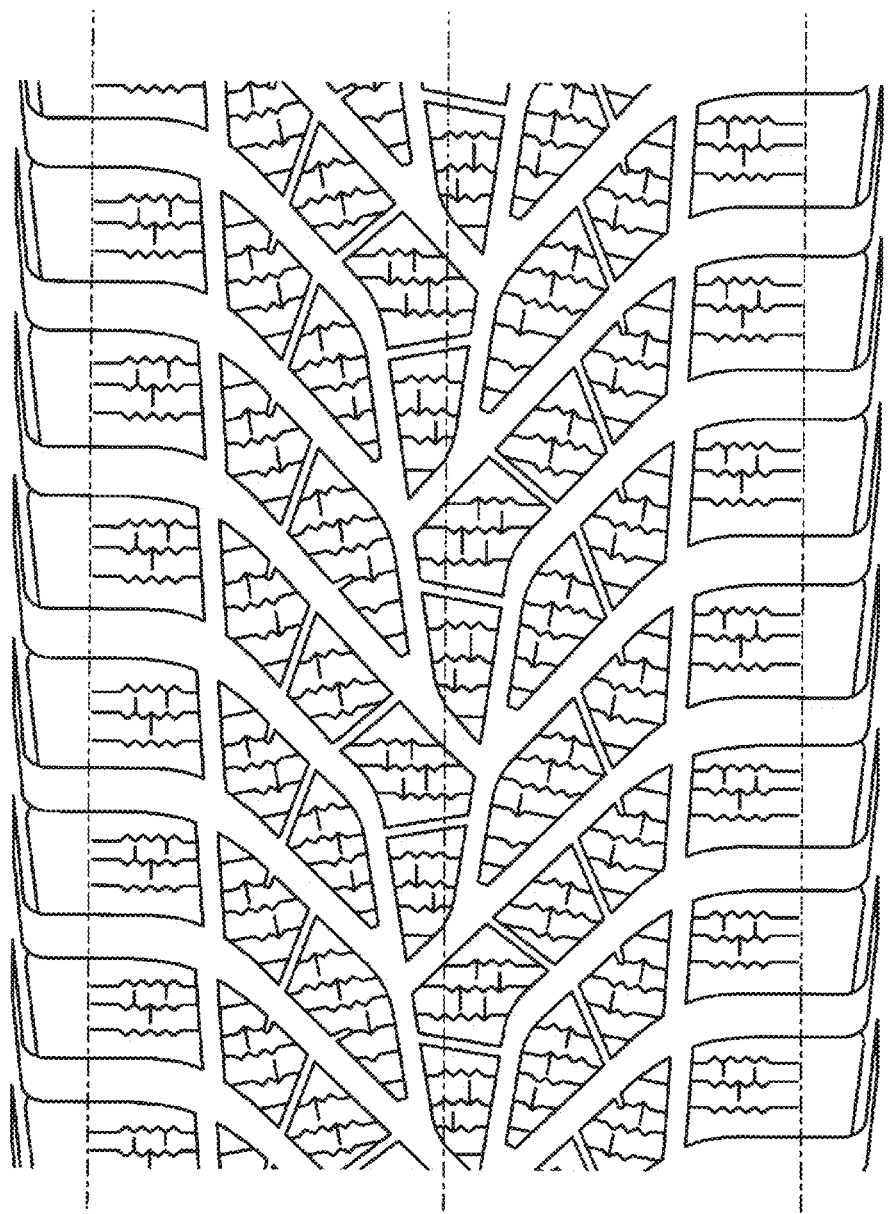
FIG. 2 is a tread plan view illustrating a pneumatic tire of a conventional example.

| | | | Standard Example | Comparative Example | | | | | | |
|---|---|---|---|---|---|---|---|---|---|---|
| | | | | 1 | 2 | 3 | 4 | 5 | 6 | 7 |
| Blend | SBR | Parts by mass | 60 | 60 | 85 | 45 | 60 | 60 | 60 | 60 |
| | BR | Parts by mass | 40 | 40 | 15 | 55 | 40 | 40 | 40 | 40 |
| | Carbon black | Parts by mass | 10 | 10 | 10 | 10 | 10 | 10 | 10 | 10 |
| | Silica-1 | Parts by mass | 140 | 140 | 140 | 140 | 110 | 190 | 140 | 140 |
| | Coupling agent-1 | Parts by mass | | 9 | | | | | | |
| | Coupling agent-2 | Parts by mass | 12 | | 9 | 9 | 7 | 14 | 5 | 11 |
| | Alkylsilane | Parts by mass | | 3 | 3 | 3 | 3 | 3 | 1.7 | 3.7 |
| | Aroma oil | Parts by mass | 60 | 60 | 60 | 60 | 40 | 80 | 60 | 60 |
| | Total of plasticizer components | (part by mass) | (60) | (60) | (60) | (60) | (40) | (80) | (60) | (60) |
| | $(M_1 + M_2)$ to silica ratio | Mass % | 8.6 | 2.1 | 8.6 | 8.6 | 9.1 | 8.9 | 4.8 | 10.5 |
| | Ratio $[M_2(M_1 + M_2)]$ | — | — | 0.00 | 0.25 | 0.25 | 0.25 | 0.30 | 0.18 | 0.25 | 0.25 |
| Workability | Green strength | Index value | 100 | 105 | 108 | 96 | 106 | 80 | 103 | 91 |
| | Extrusion formability | Rating | 3 | 3 | 3 | 1 | 3 | 2 | 2 | 2 |
| | Payne effect | Index value | 100 | 70 | 101 | 98 | 120 | 75 | 87 | 116 |
| Tire Performance | Pattern of tread portion | — | FIG. 2 | FIG. 2 | FIG. 2 | FIG. 21 | FIG. 2 | FIG. 2 | FIG. 2 | FIG. 2 |
| | Driving performance on snow | Index value | 100 | 94 | 90 | 112 | 106 | 93 | 98 | 108 |
| | Braking performance on snow | Index value | 100 | 82 | 93 | 115 | 110 | 92 | 96 | 107 |
| | Wet grip performance | Rating | 3 | 2 | 4 | 2 | 2 | 4 | 2 | 4 |

TABLE 2

| | | | Comparative Example | | | Example | | | | |
|---|---|---|---|---|---|---|---|---|---|---|
| | | | 8 | 9 | 10 | 1 | 2 | 3 | 4 | 5 |
| Blend | SBR | Parts by mass | 60 | 60 | 60 | 60 | 60 | 60 | 60 | 60 |
| | BR | Parts by mass | 40 | 40 | 40 | 40 | 40 | 40 | 40 | 40 |
| | Carbon black | Parts by mass | 10 | 10 | 10 | 10 | 10 | 10 | 10 | 10 |
| | Silica-1 | Parts by mass | 140 | 140 | 140 | 140 | 140 | 140 | 140 | 140 |
| | Coupling agent-2 | Parts by mass | 11 | 5 | 9 | 9 | 8 | 10 | 10 | 8 |
| | Alkylsilane | Parts by mass | 0.5 | 7 | 3 | 3 | 5 | 3 | 3 | 5 |
| | Liquid BR-1 | Parts by mass | | | | | | 5 | | |
| | Liquid BR-2 | Parts by mass | | | | | | | 5 | |

TABLE 2-continued

|  |  |  | Comparative Example ||| Example |||||
|---|---|---|---|---|---|---|---|---|---|---|
|  |  |  | 8 | 9 | 10 | 1 | 2 | 3 | 4 | 5 |
|  | Aroma oil | Parts by mass | 60 | 60 | 40 | 60 | 55 | 55 | 55 | 55 |
|  | Total of plasticizer components | (part by mass) | (60) | (60) | (40) | (60) | (55) | (55) | (55) | (55) |
|  | $(M_1 + M_2)$ to silica ratio | Mass % | 8.2 | 8.6 | 8.6 | 8.6 | 9.3 | 9.3 | 9.3 | 9.3 |
|  | Ratio $[M_2(M_1 + M_2)]$ | — | 0.04 | 0.58 | 0.25 | 0.25 | 0.38 | 0.23 | 0.23 | 0.38 |
| Workability | Green strength | Index value | 100 | 92 | 103 | 101 | 100 | 101 | 104 | 100 |
|  | Extrusion formability | Rating | 3 | 1 | 3 | 3 | 3 | 3 | 3 | 3 |
|  | Payne effect | Index value | 101 | 109 | 96 | 105 | 111 | 105 | 107 | 111 |
| Tire Performance | Pattern of tread portion | — | FIG. 2 | FIG. 2 | FIG. 2 | FIG. 2 | FIG. 2 | FIG. 2 | FIG. 2 | FIG. 1 |
|  | Driving performance on snow | Index value | 100 | 94 | 93 | 103 | 104 | 103 | 106 | 104 |
|  | Braking performance on snow | Index value | 100 | 102 | 96 | 103 | 103 | 104 | 107 | 106 |
|  | Wet grip performance | Rating | 3 | 2 | 2 | 4 | 4 | 4 | 5 | 5 |

TABLE 3

| Common formulation of rubber composition for tire ||
|---|---|
| Zinc oxide | 2.0 parts by mass |
| Stearic acid | 1.0 part by mass |
| Anti-aging agent-1 | 3.0 parts by mass |
| Anti-aging agent-2 | 2.0 parts by mass |
| Sulfur | 1.5 parts by mass |
| Vulcanization accelerator-1 | 2.3 parts by mass |
| Vulcanization accelerator-2 | 2.0 parts by mass |

In Tables 1 and 2, the types of raw materials used are as follows.

SBR: Styrene butadiene rubber, TUFDENE E581, available from Asahi Kasei Corporation BR: Butadiene rubber; Nipol BR 1220, available from Zeon Corporation Carbon black: Sho Black N339, available from Cabot Japan K.K.

Silica-1: ZEOSIL 1165MP, available from Solvay, CTAB adsorption specific surface area: 159 m²/g Coupling agent-1: Si69, available from Evonik Degussa, bis(triethoxysilylpropyl) tetrasulfide Coupling agent-2: NXT, available from Momentive, 3-octanoylthio-1-propyltriethoxysilane Alkylsilane: KBE-3083, available from Shin-Etsu Chemical Co., Ltd., octyltriethoxysilane Liquid BR-1: LBR 302, available from Kuraray Co., Ltd., number average molecular weight: 5000

Liquid BR-2: LBR 305, available from Kuraray Co., Ltd., number average molecular weight: 30000

Aroma oil: Extract No. 4S, available from Showa Shell Sekiyu K.K.

For Table 3, the types of the used raw materials are as follows.

Zinc oxide: Zinc Oxide III, available from Seido Chemical Industry Co., Ltd.

Stearic acid: beads stearic acid, available from NOF Corporation

Anti-aging agent-1: Santoflex 6PPD, available from Solutia Europe

Anti-aging agent-2: Pilnox TDQ, available from Nocil Limited

Sulfur: Golden Flower oil treated sulfur powder (sulfur content: 95.24 mass %), available from Tsurumi Chemical Industry Co., Ltd.

Vulcanization accelerator-1: NOCCELER CZ-G (CZ), available from Ouchi Shinko Chemical Industrial Co., Ltd.

Vulcanization accelerator-2: Soxinol D-G (DPG), available from Sumitomo Chemical Co., Ltd.

As can be seen from Table 2, it was confirmed that the rubber compositions of Examples 1 to 5 had excellent green strength, extrusion formability, and Payne effect, and the tires obtained by these had excellent driving performance on snow, braking performance on snow, and wet grip performance.

As can be seen from Table 1, the rubber composition for a tire obtained in Comparative Example 1 had a small index value of the Payne effect and dispersibility of silica was poor because Si69 was blended in place of the 3-octanoylthio-1-propyltriethoxysilane. The tire using this also had poor braking performance on snow and wet grip performance.

Because the rubber composition for a tire of Comparative Example 2 contained less than 25 parts by mass of the butadiene, the tire using this had poor driving performance on snow and braking performance on snow.

Because the rubber composition for a tire of Comparative Example 3 contained more than 50 parts by mass of the butadiene, the green strength, extrusion formability, and Payne effect were deteriorated, and the tire using this had poor wet grip performance.

Because the rubber composition for a tire of Comparative Example 4 contained less than 120 parts by mass of the silica, the tire using this had poor wet grip performance.

Because the rubber composition for a tire of Comparative Example 5 contained more than 180 parts by mass of the silica, the green strength, extrusion formability, and Payne effect were deteriorated, and the tire using this had poor driving performance on snow and braking performance on snow.

Because the rubber composition for a tire of Comparative Example 6 had the total $(M_1+M_2)$ of the 3-octanoylthio-1-propyltriethoxysilane and the alkylsilane of less than 5 mass % with respect to the mass of the silica, silica dispersibility was poor. Furthermore, the tire using this had poor driving performance on snow and braking performance on snow.

Because the rubber composition for a tire of Comparative Example 7 had the total $(M_1+M_2)$ of the 3-octanoylthio-1-propyltriethoxysilane and the alkylsilane of more than 10 mass % with respect to the mass of the silica, forming processability was poor.

As can be seen from Table 2, because the rubber composition for a tire of Comparative Example 8 had the ratio $[M_2/(M_1+M_2)]$ of the alkylsilane $M_2$ with respect to the total $(M_1+M_2)$ of the 3-octanoylthio-1-propyltriethoxysilane and the alkylsilane of less than 0.10, the forming processability and the driving performance on snow and the braking performance on snow of the tire using this cannot be enhanced to better than those of Standard Example.

Because the rubber composition for a tire of Comparative Example 9 had the ratio $[M_2/(M_1+M_2)]$ of the alkylsilane $M_2$ with respect to the total (M: $+M_2$) of the 3-octanoylthio-1-propyltriethoxysilane and the alkylsilane of more than 0.40, the green strength and extrusion formability were deteriorated, and the tire using this had poor driving performance on snow and wet grip performance.

Because the rubber composition for a tire of Comparative Example 10 contained less than 50 parts by mass of the plasticizer component, the Payne effect was deteriorated, and the tire using this had poor driving performance on snow, braking performance on snow, and wet grip performance.

The invention claimed is:

1. A rubber composition for a tire, the rubber composition comprising:
   in 100 parts by mass of a diene rubber containing from 25 to 50 mass % of a butadiene rubber,
   50 parts by mass or more of a plasticizer component,
   from 120 to 180 parts by mass of silica,
   $M_1$ parts by mass of 3-octanoylthio-1-propyltriethoxysilane, and
   $M_2$ parts by mass of alkylsilane,
   $(M_1+M_2)$, a total of the 3-octanoylthio-1-propyltriethoxysilane and the alkylsilane being from 5 to 10 mass % with respect to the mass of the silica, and
   $[M_2/(M_1+M_2)]$, a ratio of the alkylsilane with respect to the total of the 3-octanoylthio-1-propyltriethoxysilane and the alkylsilane, being from 0.10 to 0.40.

2. The rubber composition for a tire according to claim 1, wherein a CTAB adsorption specific surface area of the silica is from 80 to 175 $m^2/g$.

3. The rubber composition for a tire according to claim 1, wherein from 3 to 20 parts by mass of a low molecular weight butadiene rubber having a number average molecular weight of 10000 to 50000 is contained in 100 parts by mass of the diene rubber.

4. A tire comprising the rubber composition for a tire according to claim 1 in a tread portion, the tire comprising:
   a plurality of first inclined main grooves being inclined to one side with respect to a tire circumferential direction, extending and opening to a tire equatorial plane and a tire ground contact edge on the one side;
   a plurality of second inclined main grooves being inclined to an other side in the tire circumferential direction, extending and opening to the tire equatorial plane and a tire ground contact edge on the other side;
   a plurality of first land portions being defined and formed by a pair of the first inclined main grooves adjacent to each other and one of the second inclined main grooves, the plurality of first land portions extending from the tire equatorial plane to the tire ground contact edge on the one side; and
   a plurality of second land portions being defined and formed by a pair of the second inclined main grooves adjacent to each other and one of the first inclined main grooves, the plurality of second land portions extending from the tire equatorial plane to the tire ground contact edge on the other side,
   the plurality of first land portions being arrayed adjacent to each other in the tire circumferential direction,
   the plurality of second land portions being arrayed adjacent to each other in the tire circumferential direction,
   the first land portions and the second land portions being arrayed in a staggered manner along the tire equatorial plane, each of the first land portions and the second land portions comprising: a plurality of through grooves extending through the land portion and opening to the pair of the inclined main grooves; and a plurality of blocks being defined and formed by the through grooves,
   the blocks comprising an innermost center block that is defined as a block closest to the tire equatorial plane, the innermost center block comprising an edge portion, the edge portion comprising a notch portion opening to a connection portion of the inclined main grooves.

5. The rubber composition for a tire according to claim 2, wherein from 3 to 20 parts by mass of a low molecular weight butadiene rubber having a number average molecular weight of 10000 to 50000 is contained in 100 parts by mass of the diene rubber.

6. A tire comprising the rubber composition for a tire according to claim 5 in a tread portion, the tire comprising:
   a plurality of first inclined main grooves being inclined to one side with respect to a tire circumferential direction, extending and opening to a tire equatorial plane and a tire ground contact edge on the one side;
   a plurality of second inclined main grooves being inclined to an other side in the tire circumferential direction, extending and opening to the tire equatorial plane and a tire ground contact edge on the other side;
   a plurality of first land portions being defined and formed by a pair of the first inclined main grooves adjacent to each other and one of the second inclined main grooves, the plurality of first land portions extending from the tire equatorial plane to the tire ground contact edge on the one side; and
   a plurality of second land portions being defined and formed by a pair of the second inclined main grooves adjacent to each other and one of the first inclined main grooves, the plurality of second land portions extending from the tire equatorial plane to the tire ground contact edge on the other side,
   the plurality of first land portions being arrayed adjacent to each other in the tire circumferential direction,
   the plurality of second land portions being arrayed adjacent to each other in the tire circumferential direction,
   the first land portions and the second land portions being arrayed in a staggered manner along the tire equatorial plane, each of the first land portions and the second land portions comprising: a plurality of through grooves extending through the land portion and opening to the pair of the inclined main grooves; and a plurality of blocks being defined and formed by the through grooves,
   the blocks comprising an innermost center block that is defined as a block closest to the tire equatorial plane, the innermost center block comprising an edge portion, the edge portion comprising a notch portion opening to a connection portion of the inclined main grooves.

* * * * *